United States Patent
Seo et al.

(10) Patent No.: US 10,016,644 B2
(45) Date of Patent: Jul. 10, 2018

(54) END BRACKET FOR SPRINKLER AND FIXING APPARATUS FOR SPRINKLER INCLUDING THE SAME

(71) Applicant: Dongwoo Flexible metal tube Co., Ltd., Namyangju-si (KR)

(72) Inventors: Myung-yul Seo, Namyangju-si (KR); Sung-ho Shin, Suwon-si (KR)

( * ) Notice: Subject to any disclaimer, the term of this patent is extended or adjusted under 35 U.S.C. 154(b) by 395 days.

(21) Appl. No.: 14/754,718

(22) Filed: Jun. 30, 2015

(65) Prior Publication Data
US 2016/0296778 A1    Oct. 13, 2016

(30) Foreign Application Priority Data

Apr. 8, 2015 (KR) .................. 10-2015-0049641

(51) Int. Cl.
| | | |
|---|---|---|
| A62C 35/68 | (2006.01) | |
| F16L 3/24 | (2006.01) | |
| F16B 2/10 | (2006.01) | |
| B05B 15/06 | (2006.01) | |
| F16L 3/10 | (2006.01) | |
| B05B 15/60 | (2018.01) | |

(52) U.S. Cl.
CPC .............. *A62C 35/68* (2013.01); *B05B 15/06* (2013.01); *B05B 15/60* (2018.02); *F16B 2/10* (2013.01); *F16L 3/1075* (2013.01); *F16L 3/24* (2013.01)

(58) Field of Classification Search
CPC ... A62C 35/68; F16L 3/24; F16B 2/10; E04B 9/006; E04B 9/18; E04B 9/20
USPC ......... 248/62, 65, 72, 73, 75, 317, 342, 343, 248/200.1, 229.15, 229.25, 228.6, 230.6, 248/231.71; 52/39, 506.07; 169/16, 17, 169/37, 41
See application file for complete search history.

(56) References Cited

U.S. PATENT DOCUMENTS

| | | | | |
|---|---|---|---|---|
| 3,798,865 A | * | 3/1974 | Curtis .................... | E04B 9/127 403/189 |
| 4,041,657 A | * | 8/1977 | Schuplin ................ | E04B 9/006 248/343 |
| 4,230,900 A | * | 10/1980 | Speet ................... | H02G 3/0493 174/493 |
| 4,663,911 A | * | 5/1987 | Gracia ................... | E04B 9/127 52/506.06 |
| D393,998 S | * | 5/1998 | Anderson ..................... | D8/394 |

(Continued)

FOREIGN PATENT DOCUMENTS

KR    10-2007-0059889    6/2007

OTHER PUBLICATIONS

The Free Dictionary, Definition of Hole, Retrieved Aug. 29, 2017, http://www.thefreedictionary.com/hole. (Year: 2017).*
English Specification of 10-2007-0059889.

*Primary Examiner* — Jonathan Liu
*Assistant Examiner* — Guang H Guan
(74) *Attorney, Agent, or Firm* — Antonio Ha & U.S. Patent, LLC

(57) ABSTRACT

A fixing apparatus for a sprinkler comprises a fixed frame horizontally extending above a ceiling material in a lengthwise direction, an installation frame horizontally extending above the fixed frame in a widthwise direction, an end bracket fastened with the fixed frame and the installation frame to fix an installation position of the sprinkler, and a center bracket having a first side allowing the installation frame to pass therethrough and a second side configured to surround the sprinkler.

2 Claims, 6 Drawing Sheets

(56) References Cited

U.S. PATENT DOCUMENTS

| | | | | |
|---|---|---|---|---|
| 6,450,465 B1* | 9/2002 | Eslick | F16B 2/10 248/230.4 |
| 6,554,231 B2* | 4/2003 | Choi | E04B 9/006 248/317 |
| 6,779,315 B1* | 8/2004 | Bongio | E04B 9/02 52/506.07 |
| 6,811,130 B1* | 11/2004 | Oh | E04B 9/006 248/343 |
| 7,240,884 B2* | 7/2007 | Shim | E04B 9/006 24/292 |
| 7,264,214 B2* | 9/2007 | Oh | A62C 35/68 169/16 |
| 7,427,051 B2* | 9/2008 | Oh | F16L 3/24 248/72 |
| 7,506,845 B2* | 3/2009 | Oh | F16L 3/24 248/72 |
| 7,735,787 B2* | 6/2010 | Kafenshtok | E04B 9/001 169/37 |
| 7,845,599 B2* | 12/2010 | Jackson | A62C 35/68 169/37 |
| 7,878,464 B2* | 2/2011 | Oh | B05B 15/061 169/41 |
| 8,109,482 B2* | 2/2012 | Oh | A62C 35/68 248/342 |
| 8,272,615 B2* | 9/2012 | Silcox | A62C 35/68 248/342 |
| 8,413,734 B2* | 4/2013 | Silcox | A62C 35/68 169/16 |
| 8,474,199 B2* | 7/2013 | Oh | A62C 35/68 248/343 |
| 8,500,079 B2* | 8/2013 | Oh | A62C 35/68 239/283 |
| 8,678,330 B2* | 3/2014 | Silcox | A62C 35/68 169/41 |
| 8,833,718 B2* | 9/2014 | Oh | A62C 35/68 239/283 |
| 8,851,196 B2* | 10/2014 | Silcox | A62C 35/68 169/16 |
| RE45,399 E * | 3/2015 | Kafenshtok | E04B 9/001 169/37 |
| 9,004,421 B2* | 4/2015 | Feenstra | A62C 35/68 248/200.1 |
| 9,004,422 B2* | 4/2015 | Feenstra | A62C 35/68 248/200.1 |
| 9,174,077 B2* | 11/2015 | Lim | A62C 35/68 |
| 9,278,238 B2* | 3/2016 | Thau, Jr. | F16B 2/10 |
| 9,308,407 B2* | 4/2016 | Jung | A62C 35/68 |
| 9,526,934 B2* | 12/2016 | Jung | A62C 35/68 |
| 9,718,076 B2* | 8/2017 | Oh | B05B 15/061 |
| 9,731,156 B2* | 8/2017 | Jung | A62C 35/68 |
| 9,889,327 B2* | 2/2018 | Mitchell | A62C 35/68 |
| 2013/0048822 A1* | 2/2013 | Liu | F16B 2/10 248/316.5 |
| 2014/0360737 A1* | 12/2014 | Kim | F16L 3/00 169/51 |
| 2015/0377386 A1* | 12/2015 | Mitchell | F16L 3/1075 169/51 |
| 2016/0296778 A1* | 10/2016 | Seo | F16L 3/24 |

* cited by examiner

END BRACKET FOR SPRINKLER AND FIXING APPARATUS FOR SPRINKLER INCLUDING THE SAME

CROSS-REFERENCE TO RELATED APPLICATION

This application claims priority to and the benefit of Korean Patent Application No. 10-2015-0049641, filed on Apr. 8, 2015, the disclosure of which is incorporated by reference herein in its entirety.

BACKGROUND

1. Field of the Invention

The present invention relates to an end bracket for a sprinkler, and a fixing apparatus for a sprinkler including the same, and more particularly, to an end bracket for a sprinkler, which is fastened to a fixed frame horizontally extending above a ceiling material and an installation frame horizontally extending above the fixed frame in a crossing, direction so as to fix an installation position of the sprinkler, and a fixing apparatus for a sprinkler including the same.

2. Discussion of Related Art

Generally, a sprinkler is a fire extinguishing system for spraying fire-fighting water in case of fire, and a plurality of sprinklers are installed at an indoor ceiling to be spaced from each other and thus to form a fire extinguishing area.

FIG. 1 illustrates a structure in which a conventional sprinkler (Korean Patent Publication No. 10-2007-0059889) is installed. Referring to FIG. 1, the conventional sprinkler 700 may be installed at a ceiling 1 using a substantially U-shaped bracket 300 including an upper plate 310, a side plate 320 and a lower plate 330. The upper plate 310 is fixed to the ceiling 1 by an anchor bolt 900, and a flexible joint 3 connected with the sprinkler 700 passes through and is fixed to the lower plate 330.

In such an assembly structure of the convention sprinkler, a head of the flexible joint 3 is installed at the bracket 300 to be movable up and down, and thus the sprinkler may be installed in a state in which a longitudinal length thereof is properly adjusted depending on a required installation height.

However, although the longitudinal length may be adjusted, as described above, there are many limitations in controlling a horizontal position at which the sprinkler 700 is exposed under a tex 2, and a piping work should be performed to supply water to the sprinkler 700 located at a determined position. Therefore, a working time is delayed, and an installation cost is excessively increased.

Also, since it is necessary to form a hole at the ceiling 1 located just above an installation position of the sprinkler 700 and then to fasten the anchor bolt 900, a working environment becomes worse due to dust generated when the hole is formed during the piping work. Also when a position of the sprinkler 700 is changed, the hole should be formed again, and thus the piping work becomes inconvenient.

Furthermore, since a fastening force between construction elements such as the bracket and the sprinkler is not strong, the elements may be easily moved during or after an installation work, or an installation state may be deformed or damaged due to their own weights.

PRIOR ART DOCUMENTS

Patent Documents

Korean Patent Publication No. 10-2007-0059889 (Jun. 12, 2007) Height adjusting apparatus of sprinkler

SUMMARY OF THE INVENTION

The present invention is directed to an end bracket for a sprinkler, and a fixing apparatus for a sprinkler including the same, which have an assembling structure to be easily installed and separated, and also further strongly fasten a bracket for fixing an installation position between the sprinkler and each frame installed at a ceiling material not to be moved.

According to an aspect of the present invention, there is provided an end bracket for a sprinkler which is fastened between as fixed frame (20) horizontally extending above a ceiling material (10) in a lengthwise direction (L) and an installation frame (30) horizontally extending above the fixed frame (20) in a widthwise direction (W) so as to fix an installation position of the sprinkler (40), including a first vertical plate (110) which is vertically disposed, and in which a first insertion hole (111) inserted onto the installation frame (30) is formed at an upper portion thereof, and a first pressing screw (112) inserted therein to press one side of a vertical wall (21) of the fixed frame (20) is fastened to a lower portion thereof; a hooking plate (120) which extends from both sides of the first vertical plate (110) in the widthwise direction W, and in which a vertical wall insertion groove (121) in which the vertical wall (21) is inserted is formed downward at a lower portion of the hooking plate (120), and a fitting protrusion (122) mating with a hook portion (22) formed at an upper end of the vertical wall (21) to be bent downward is formed at an inside of the vertical wall insertion groove (121) to protrude upward; and a horizontal plate (130) which is formed to extend horizontally from an upper end of the first vertical plate (110) in the widthwise direction (W), and in which a second pressing screw (131) inserted into an inside thereof to press an upper surface of the installation frame (30) is fastened at a center thereof.

The end bracket may further include a second vertical plate (140) configured to vertically extend downward from an end of the horizontal plate (130) and having a second insertion hole (141) formed at a position facing the first insertion hole (111) to be inserted onto the installation frame (30).

The hooking plate (120) may include a pressing plate (123) formed to extend inward in the lengthwise direction L, and disposed upright to face the first pressing screw (112) and to press the other side of the vertical wall (21) of which one side is pressed by the first pressing screw (112).

The pressing plate (123) may be formed to be bent inward from each of two hooking plates (120) formed to extend from both sides of the first vertical plate (110), and two first pressing screws (112) may be formed at positions of the first vertical plate (110) facing the pressing plates (123).

The pressing plate (123) may be formed by bending inward a part of cut portion of the hooking plate (120) configured to form the vertical wall insertion groove (121).

The fitting protrusion (122) may be formed to extend long from an upper end of the pressing plate (123) in the lengthwise direction L.

According to another aspect of the present invention, there is provided a fixing apparatus for a sprinkler including the same, which is fastened to a fixed frame (20) horizontally extending above a ceiling material (10) in a lengthwise direction (L) and an installation frame (30) horizontally extending above the fixed frame (20) in a widthwise direction (W) so as to fix an installation position of the sprinkler (40), including an end bracket (100) including a first vertical plate (110) which is vertically disposed, and in which a first insertion hole (111) inserted onto the installation frame (30) is formed at an upper portion thereof, and a first pressing screw (112) inserted therein to press one side of a vertical wall (21) of the fixed frame (20) is fastened to a lower portion thereof, a hooking plate (120) which extends from both sides of the first vertical plate (110) in the widthwise direction (W), and in which a vertical wall insertion groove (121) in which the vertical wall (21) is inserted is formed downward at a lower portion of the hooking plate (120), and a fitting protrusion (122) mating with a hook portion (22) formed at an upper end of the vertical wall (21) to be bent downward is formed at an inside of the vertical wall insertion groove (121) to protrude upward, and a horizontal plate (130) which is formed to extend horizontally from an upper end of the first vertical plate (110) in the widthwise direction (W), and in which a second pressing screw (131) inserted into an inside thereof to press an upper surface of the installation frame (30) is fastened at a center thereof; and a center bracket (200) of which one side is inserted onto the installation frame (30), and the other side is installed at one side around the sprinkler (40).

The center bracket (200) may include a base frame (210) which is horizontally disposed, and in which insertion holes (211) inserted onto the installation frame (30) are formed at both sides thereof, and a supporting groove (212) configured to support one side of a circumference of the sprinkler (40) is formed at an inner side portion thereof; and a rotating frame (220) which is horizontally disposed, and of which one end is rotatably coupled to one side of the base frame (210), and in which as pressing groove (221) configured to press the other side of the circumference of the sprinkler (40) is formed at an inner side portion thereof facing the supporting groove (212), and the other end thereof is detachably coupled to the other side of the base frame (210).

A coupling hole (215) having a female screw thread may be formed at the other side of the base frame (210), a screw hole (222) formed at a position corresponding to the coupling hole (215) may be formed at the other end of the rotating frame (220), and the center bracket may further include as fastening screw (230) which is rotatably fixed so that a body (231) thereof having a male screw thread is inserted into the screw hole (222), and thus a head (232) thereof is supported by a circumference of the screw hole (222), and a snap ring (240) is inserted onto the body (231) at a position opposite to the head (232), while the rotating frame (220) is interposed between the snap ring (240) and the head (232).

A recessed portion (216) thrilled at the other surface of the base frame (210), in which the coupling hole (215) is formed may be formed at a circumference of the coupling hole (215) so as to be more recessed than a surface.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. The description proposed herein is just a preferable example for the purpose of illustrations only, not intended to limit the scope of the invention, so it should be understood that other equivalents and modifications could be made thereto without departing from the spirit and scope of the invention.

Figure 1:
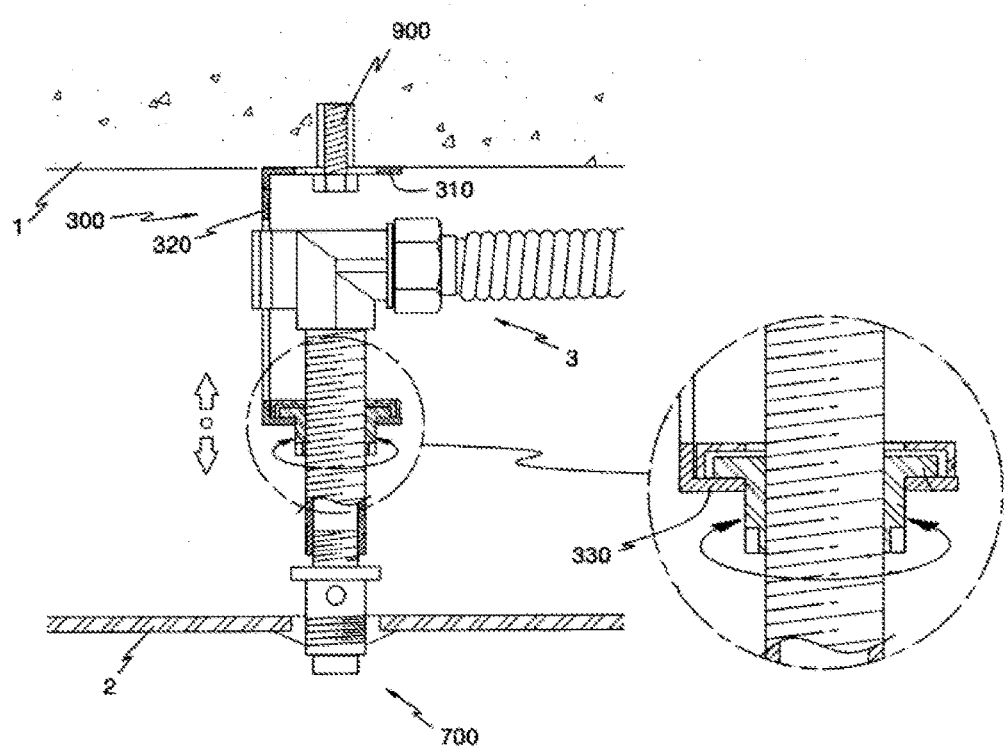
FIG. 1 is a side cross-sectional view illustrating a structure in which a conventional sprinkler is installed.
Figure 2:
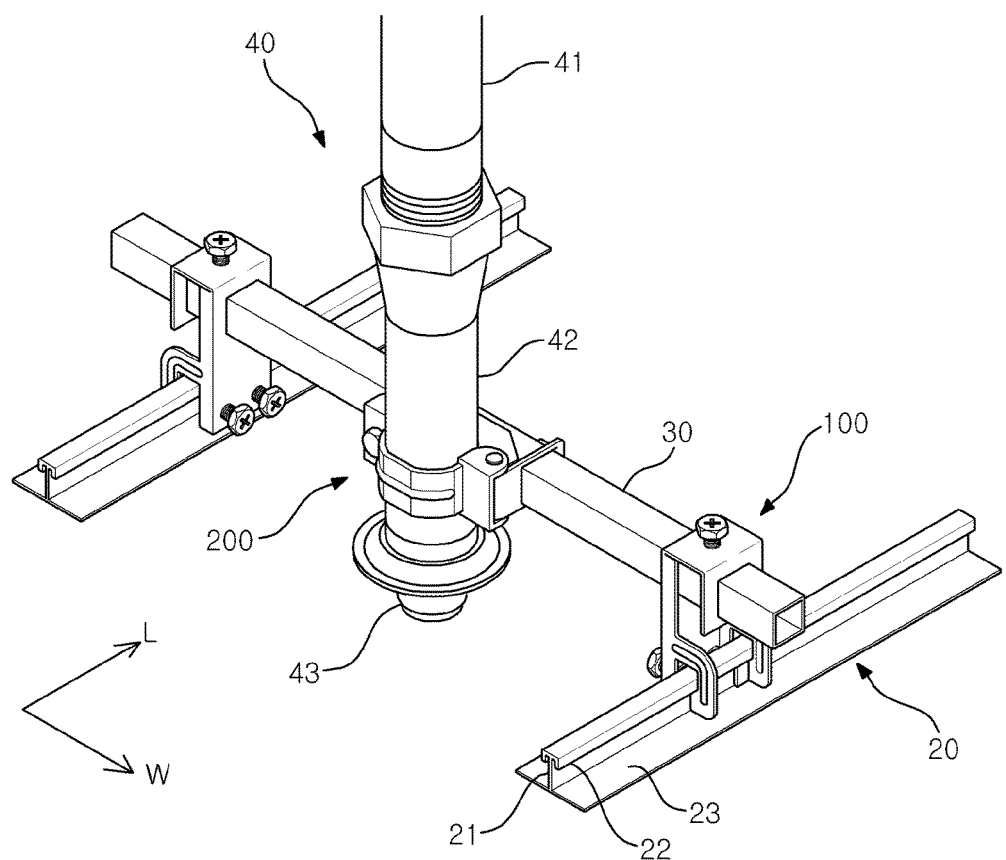
FIG. 2 is a perspective view illustrating an entire structure of a fixing apparatus for a sprinkler according to an embodiment of the present invention.

A fixing apparatus for a sprinkler according to an embodiment of the present invention is a fixing unit which is fastened to a fixed frame 20 horizontally extending above a ceiling material 10, such as a tex, in a lengthwise direction L and an installation frame 30 horizontally extending above the fixed frame 20 in a widthwise direction W so as to fix an installation position of the sprinkler 40, and includes an end bracket 100 which is installed between the fixed frame 20 and the installation frame 30 to adjust the installation position of the sprinkler 40 in the lengthwise direction L, and a center bracket 200 which is installed between the installation frame 30 and the sprinkler 40 to adjust the installation position of the sprinkler 40 in the widthwise direction W, as illustrated in FIG. 2.

Here, the terms "lengthwise direction L" and "widthwise direction W" are used to define a forming direction of each element and also to simplify description of the present invention, but does not indicate or mean related elements or components to have a specific direction.

Also, the fixed frame 20 is a frame structure which provides a route, to adjust the installation position of the sprinkler 40 above the ceiling in the lengthwise direction L, and may be a T bar having a T-shaped cross section, as illustrated in the drawing. Also, another frame structure including a horizontal plate 23, such as a C-shaped channel having a C shape, which is in close contact with an upper surface of the ceiling material 10 and fastened thereto, a vertical wall 21 which protrudes upward from the horizontal plate 23 and extends in the lengthwise direction L, and a hook portion 22 formed at an upper portion of the vertical wall 21 to be bent downward may be used as the fixed frame 20.

In addition, the installation frame 30 is a frame structure which is installed above the fixed frame 20 to cross thereover and provides a route to adjust the installation position of the sprinkler 40 in the widthwise direction W, and may be formed to have a square pipe shape, as illustrated in the drawing. Also, another frame structure which may provide a supporting force, like the C-shaped channel or a circular pipe, and linearly extends may be used as the installation frame 30. However, shapes of insertion holes 111, 141 and 211 formed at the end bracket 100 and the center bracket 200 should be changed to be matched with a cross-sectional shape of the installation frame 30.

Figure 3:
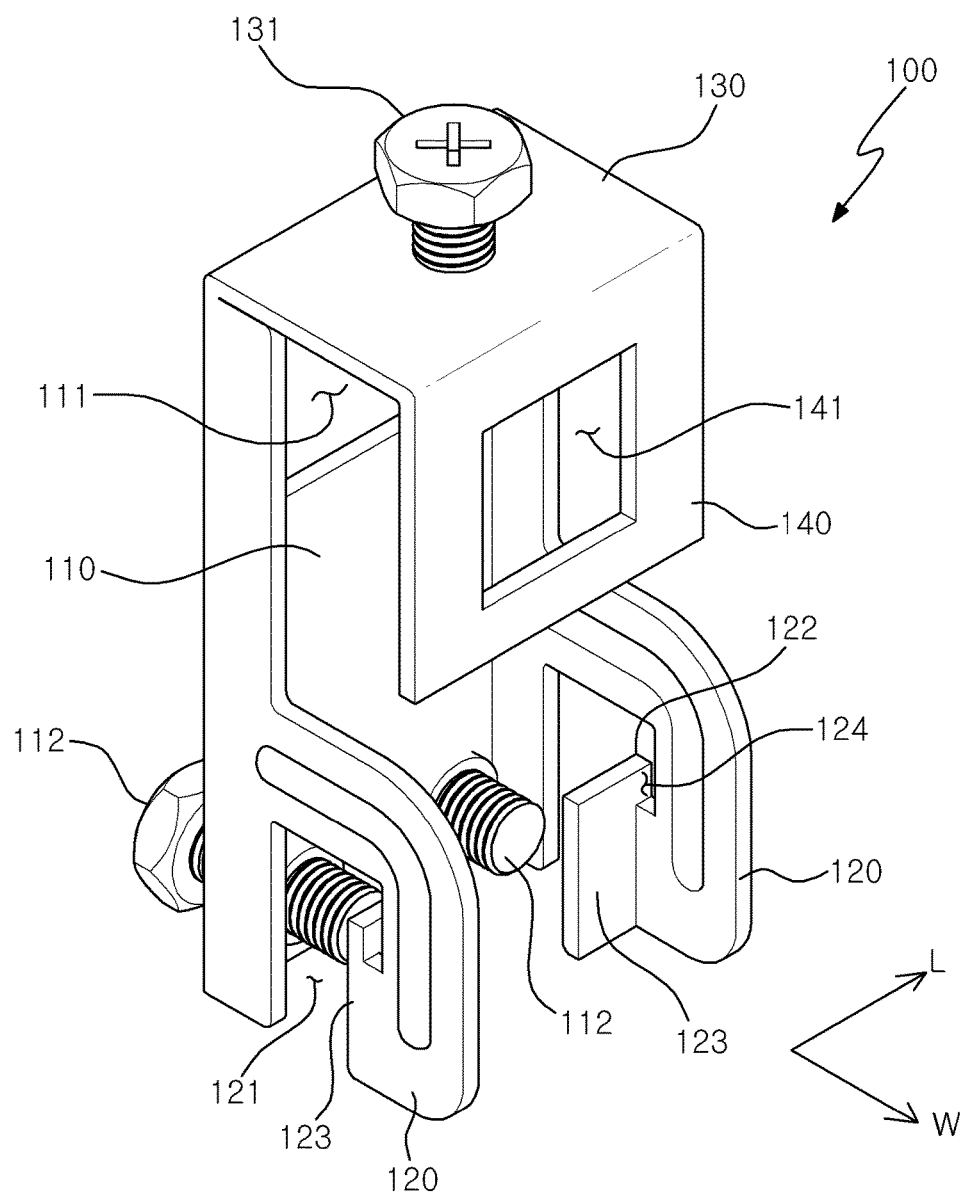
FIG. 3 is a perspective view illustrating a structure of an end bracket according to the embodiment of the present invention.

The end bracket 100 is a bracket which is installed at a predetermined position on the fixed frame 20, while being installed at the installation frame 30, so as to adjust the installation position of the sprinkler 40 in the lengthwise direction L, and includes a first vertical plate 110, a hooking plate 120 and a horizontal plate 130, as illustrated in FIGS. 2 and 3.

The first vertical plate 110 is a plate which is vertically disposed to form a base of the end bracket 100, and a first insertion hole 111 inserted onto the installation frame 30 is formed at an upper portion thereof to be opened laterally; and a first pressing screw 112 inserted therein to press one side of the vertical wall 21 of the fixed frame 20 is fastened to a lower portion thereof.

Also, the first insertion hole 111 is formed to have a shape corresponding to the cross-sectional shape of the installation frame 30, to be inserted onto one position of the installation frame 30 and thus to be firmly supported. A screw hole matched with a male screw thread of the first pressing screw 112 is formed at a position in which the first pressing screw 112 is inserted, and thus, as illustrated in FIG. 3, according to a rotating direction of the first pressing screw 112, the first pressing screw 112 may be inserted into an inside of the end bracket 100 to press the one side of the vertical wall 21 of the fixed frame 20 or may be moved to an outside of the end bracket 100 to be spaced from the vertical wall 21.

The hooking plate 120 is a fixed plate which is formed to be bent and thus to be coupled to the fixed frame 20, and extends from both sides of the first vertical plate 110 in the widthwise direction W. A vertical wall insertion groove 121 in which the vertical wall 21 is inserted is formed downward at a lower portion of the hooking plate 120, and a fitting protrusion 122 mating with the hook portion 22 formed at an upper end of the vertical wall 21 to be bent downward is formed at an inside of the vertical wall insertion groove 121 to protrude upward.

Here, as illustrated in FIG. 2, the fitting protrusion 122 has a shape which extends toward an inner side of the vertical wall insertion groove 121 and then is bent upward so as to be mating with the hook portion 22, and thus a hook insertion groove 124 in which the hook portion 22 is inserted and supported may be preferably formed between the fitting protrusion 122 and an inner diameter of the vertical wall insertion groove 121.

The end bracket 100 may be effectively prevented from being moved up and down with respect to the fixed frame 20 by a mating structure between the hook portion 22 of the fixed frame 20 and the fitting protrusion 122 of the hooking plate 120 and a pressing structure of the first pressing screw 112.

The horizontal plate 130 is a fixing plate which fixes an installed state of the end bracket 100 inserted into the installation frame 30. The horizontal plate 130 is formed to extend horizontally from an upper end of the first vertical plate 110 in the widthwise direction W, and a second pressing screw 131 inserted into an inside of the horizontal plate 130 to press an upper surface of the installation frame 30 is fastened at a center thereof.

Here, a screw hole matched with a male screw thread of the second pressing screw 131 is formed at a position of the horizontal plate 130 in which the second pressing screw 131 is inserted, and thus, as illustrated in FIG. 3, according to a rotating direction of the second pressing screw 131, the second pressing screw 131 may be inserted into an inside of the end bracket 100 to press the upper surface of the installation frame 30 or may be moved to an outside of the end bracket 100 to be spaced from the upper surface of the installation frame 30.

The present invention has such an assembling structure in which the end bracket 100 is disposed to be fitted to the fixed frame 20 or to be inserted onto the installation frame 30 through a structure of the end bracket 100 in which the first vertical plate 110, the hooking plate 120 and the horizontal plate 130 are combined, and a disposed state of the end bracket 100 is fixed using the first and second pressing screws 112 and 131. Therefore, the installation position of the sprinkler 40 may be easily controlled, and also since an installing and separating operation is easily performed, workability may be increased, and installation cost may be reduced.

Meanwhile, as illustrated in FIGS. 2 and 3, the hooking plate 120 may have a pressing plate 123 which is formed to extend inward in the lengthwise direction L, and disposed upright to face the first pressing screw 112 and to press the other side of the vertical wall 21 of which one side is pressed by the first pressing screw 112. Therefore, an end of the first pressing screw 112 and the pressing plate 123 may press simultaneously the vertical wall 21 from both sides so as to provide a fixing force, while the vertical wall 21 is interposed therebetween, and thus a fastened state may be firmly maintained.

Also, the pressing plate 123 is disposed vertically to be in surface contact with a side surface of the fixed frame 20, while facing the other side of the fixed frame 20, and thus a thin side part of the hooking plate 120 may be prevented from being pressed and deformed, or the fastening force may be prevented from being reduced, compared with the case in which the fixed frame 20 and the hooking plate 120 are in line contact with each other.

In addition, the pressing plate 123 is bent inward at each of two hooking plates 120 extending from both sides of the first vertical plate 110, and two first pressing screws 112 may be fastened at positions of the first vertical plate 110 which face each pressing plate 123. Therefore, compared with the fastening which is performed using one pressing plate 123 and one first pressing screw 112, the fastening force may be further increased, and also a horizontal movement may be effectively prevented.

The pressing plate 123 may be formed by bending inward a part of cut portion of the booking plate 120 which forms the vertical wall insertion groove 121. Therefore, a pressing plate 123 separately manufactured to provide the pressing plate 123 does not need to be welded or screw-fastened to the first vertical plate 110, but the pressing plate 123 may be machined during a cutting process for forming a shape of the end bracket 100, and thus a manufacturing process may be simplified, and thus the workability may be increased, and the manufacturing cost may be reduced.

Also, as illustrated in FIG. 3, the fitting protrusion 122 may be formed to extend long from an upper end of the pressing plate 123 in the lengthwise direction L, and thus to increase a portion mating with the hook portion 22. Therefore, the fastening force may be more firmly provided, and a left and right movement may be further effectively prevented.

Meanwhile, the end bracket 100 according to the embodiment of the present invention may be provided to prevent a lateral movement in the widthwise direction W. To this end, the end bracket 100 further includes a second vertical plate 140 which vertically extends downward from an end of the horizontal plate 130 and has a second insertion hole 141 formed at a position facing the first insertion hole 111 to be inserted onto the installation frame 30.

Since the second insertion hole 141 opened to face the first insertion hole 111 is formed at a position spaced a predetermined distance from the first vertical plate 110 through a structure of the second vertical plate 140, the first and second insertion holes 111 and 141 may be simultaneously inserted and supported onto the installation frame 30, and thus an up and down movement of the end bracket 100 may be effectively prevented.

The center bracket 200 is a bracket which is installed on the predetermined position of the installation frame 30, while being installed at the sprinkler 40, so as to control the installation position of the sprinkler 40 in the widthwise direction W. One side of the center bracket 200 is inserted onto the installation frame 30, and the other side thereof is installed, at one side around the sprinkler 40.

Here, as illustrated in FIG. 2, the sprinkler 40 includes a water pipe 41 through which water is supplied, and a reducer 42 of which one end is connected with one end of the water pipe 41 to be in communication therewith, and in which a nozzle 43 for spraying the supplied water is installed at the other end. The center bracket 200 is fastened to the installation frame 30, while being installed at one side around the reducer 42.

Figure 4:
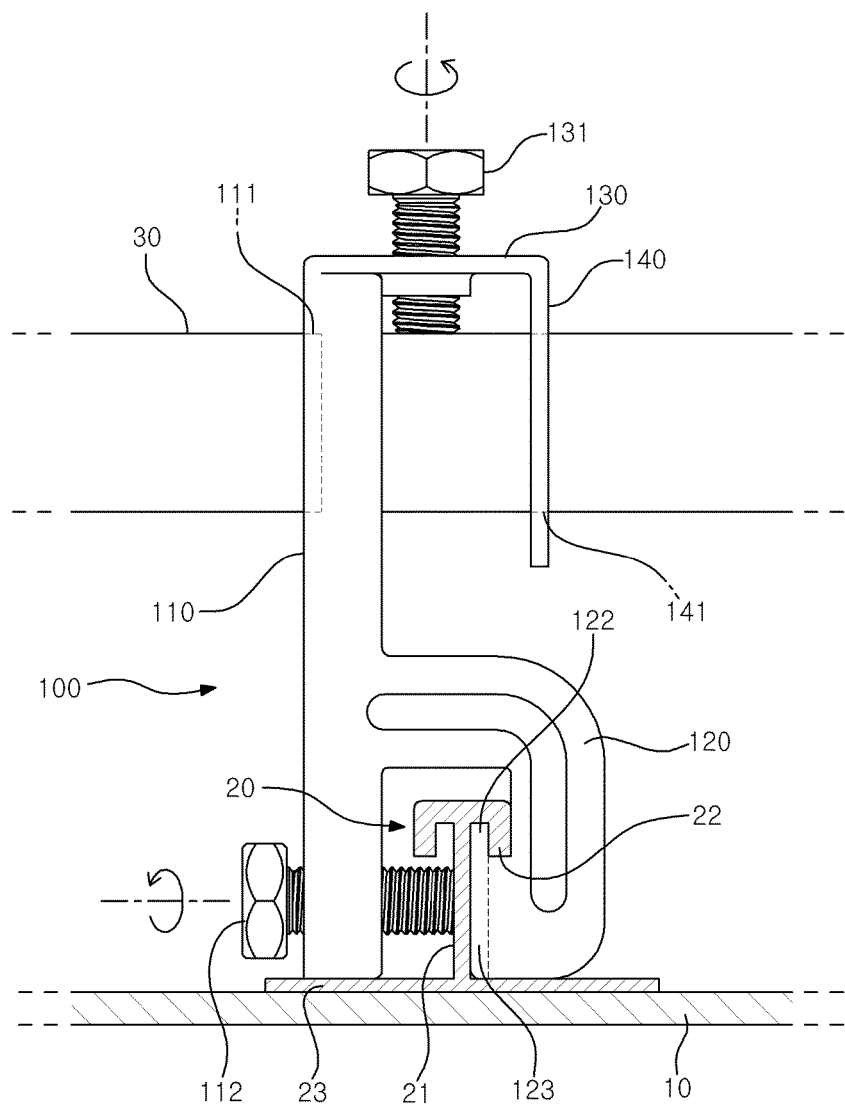
FIG. 4 is a side view illustrating a structure in which the end bracket according to the embodiment of the present invention is installed at a fixed frame and an installation frame.
Figure 5:
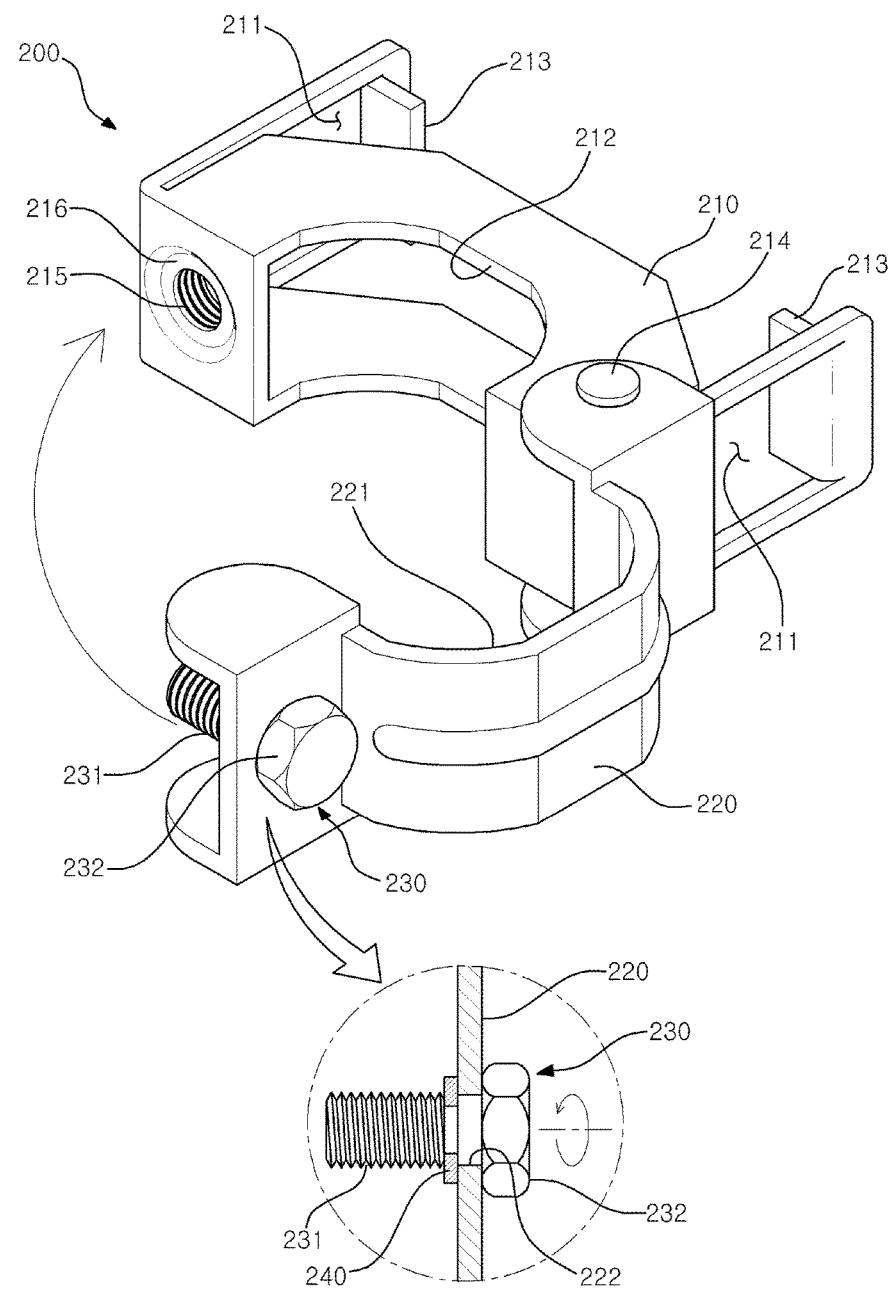
FIG. 5 is a perspective view illustrating a structure and an operation principle of a center bracket according to the embodiment of the present invention.
Figure 6:
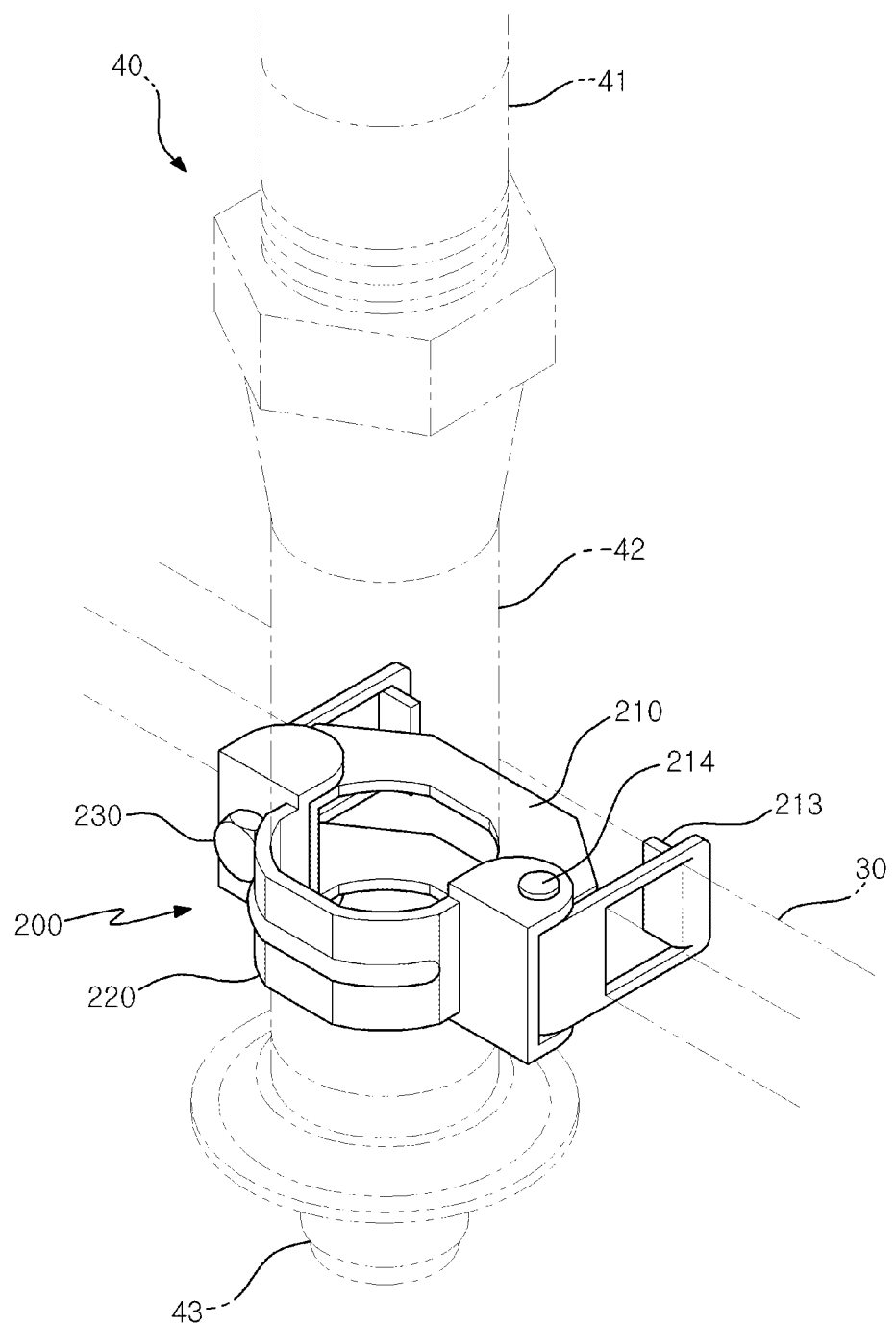
FIG. 6 is a perspective view illustrating a structure in which the center bracket according to the embodiment of the present invention is installed at the installation frame and the sprinkler.

More specifically, referring to FIGS. 4 and 5, the center bracket 200 includes a base frame 210 and a rotating frame 220. The base frame 210 is horizontally disposed, and insertion holes 211 inserted onto the installation frame 30 are formed at both sides thereof, and a supporting groove 212 configured to support one side of a circumference of the reducer 42 of the sprinkler 40 is formed at an inner side portion thereof.

Also, the rotating frame 220 is horizontally disposed, and one end thereof is rotatably coupled to one side of the base frame 210, and a pressing groove 221 configured to press the other side of the circumference of the reducer 42 is formed at an inner side portion thereof facing the supporting groove 212, and the other end thereof is detachably coupled to the other side of the base frame 210.

Here, in detachably coupling the rotating frame 220 to the other side of the base frame 210, as illustrated in FIG. 5, a coupling hole 215 having a female screw thread is formed at the other side of the base frame 210, and a screw hole 222 formed at a position corresponding to the coupling hole 215 is formed at the other end of the rotating frame 220. The center bracket 200 further includes a fastening screw 230 which is rotatably fixed so that a body 231 thereof having a male screw thread is inserted into the screw hole 222, and thus a head 232 thereof is supported by a circumference of the screw hole 222, and a snap ring 240 is inserted onto the body 231 at a position opposite to the head 232, while the rotating frame 220 is interposed between the snap ring 240 and the head 232.

Through a structure of the fastening screw 230, the center bracket 200 may be easily installed, and also a loss of the fastening screw 230 may be prevented.

Also, a recessed portion 216 formed at the other surface of the base frame 210, in which the coupling hole 215 is formed may be formed at a circumference of the coupling hole 215 so as to be more recessed than a surface. Even when the rotating frame 220 is rotated, while the fastening screw 230 is fastened, an interference between the fastening screw 230 and the coupling hole 215 may be prevented by the recessed portion 216.

As described above, since the rotating frame 220 is integrally provided at the base frame 210 to be rotatable about the rotating shaft 214, and thus a coupling operation is performed by opening and closing one component, i.e., the center bracket 200, a worker's convenience may be increased, and working efficiency may be also enhanced, compared with the conventional structure having two components.

A supporting plate 213 which is bent and extends in the widthwise direction W is formed at an inside of the insertion hole 211 and thus may further stably support the installation frame 30 inserted into the insertion hole 211.

The end bracket for the sprinkler and the fixing apparatus for the sprinkler including the same have the following effects:

First, since the present invention has such an assembling structure, in which the end bracket 100 is disposed to be fitted to the fixed frame 20 or to be inserted onto the installation frame 30, and the disposed state of the end bracket 100 is fixed using the first and second pressing screws 112 and 131, the installation position of the sprinkler 40 can be easily controlled, and also since the installing and separating operation is easily performed, workability can be increased, and installation cost can be reduced.

Second, since the end bracket 100 fixedly installed at one position of the fixed frame 20 includes the pressing plate 123 which is formed to extend inward in the lengthwise direction L, and disposed upright to face the first pressing screw 112 and to press the other side of the vertical wall 21 of the fixed frame 20, of which one side is pressed by the first pressing screw 112, the end of the first pressing screw 112 and the pressing plate 123 can press simultaneously the vertical wall 21 from both sides so as to provide the fixing force, while the vertical wall 21 is interposed therebetween, and thus the fastened state can be firmly maintained.

Third, the pressing plate 123 is disposed vertically to be in surface contact with a side surface of the fixed frame 20, while facing the other side of the fixed frame 20, and thus a thin side part of the hooking plate 120 may be prevented from being pressed and deformed, or the fastening force can be prevented from being reduced, compared with the case in which the fixed frame 20 and the hooking plate 120 are in line contact with each other.

Fourth, since the pressing plate 123 is bent inward at each of two hooking plates 120 extending from both sides of the vertically disposed first vertical plate 110, and the two first pressing screws 112 are fastened at positions of the first vertical plate 110 which face each pressing plate 123, the fastening force can be further increased, and also the horizontal movement can be effectively prevented, compared with the fastening which is performed using one pressing plate 123 and one first pressing screw 112.

Fifth, the pressing plate 123 is formed by bending inward a part of cut portion of the hooking plate 120 which forms the vertical wall insertion groove 121, and thus, the pressing plate 123 separately manufactured to provide the pressing plate 123 does not need to be welded or screw-fastened to the first vertical plate 110, but the pressing plate 123 can be machined during the cutting process for forming the shape of the end bracket 100, and thus the manufacturing process may be simplified, and thus the workability can be increased, and the manufacturing cost can be reduced.

Sixth, the fitting protrusion 122 of the hooking plate 120 mating with the hook portion 22 bent downward from the upper end of the vertical wall 21 is formed to extend long from the upper end of the pressing plate 123 in the lengthwise direction L, and to increase a portion mating with the hook portion 22, and thus the fastening force can be more firmly provided.

Seventh, since the first insertion hole 111 inserted on the installation frame 30 is formed at the first vertical plate 110, and the second vertical plate 140 in which the second insertion hole 141 opened to face the first insertion hole 111 is formed at a position spaced a predetermined distance from the first vertical plate 110 is disposed, the first and second insertion holes 111 and 141 can be simultaneously inserted and supported onto the installation frame 30, and thus the up and down movement of the end bracket 100 can be effectively prevented.

Eighth, since the rotating frame 220 of the center bracket 200 is horizontally disposed so that one end thereof is rotatably coupled to one side of the base frame 210, and the fastening screw 230 which is rotatably fixed such that the snap ring 240 is inserted at a position corresponding to the fastening hole 215 formed at the other side of the base frame 210 is provided, the center bracket 200 can be easily installed, and also the loss of the fastening screw 230 can be prevented.

Ninth, since the recessed portion 216 formed at the other surface of the base frame 210, in which the coupling hole 215 is formed, so as to be more recessed than the surface is formed at a circumference of the coupling hole 215, even when the rotating frame 220 is rotated, while the fastening screw 230 is fastened, the interference between the fastening screw 230 and the coupling hole 215 can be prevented by the recessed portion 216.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A fixing apparatus for a sprinkler, the fixing apparatus comprising:
    a fixed frame horizontally extending above a ceiling material in a lengthwise direction;
    an installation frame horizontally extending above the fixed frame in a widthwise direction;
    an end bracket fastened with the fixed frame and the installation frame to fix an installation position of the sprinkler, the end bracket comprising:
        a first vertical plate;
        a first insertion hole formed in an upper portion of the first vertical plate, wherein the installation frame is inserted through the first insertion hole;
        a first pressing screw inserted through a lower portion of the first vertical plate to press a first side of a vertical wall of the fixed frame;
        a hooking plate extending from the first vertical plate in the widthwise direction;
        a vertical wall insertion groove formed in the hooking plate to allow the vertical wall to be inserted through the vertical wall insertion groove;
        a fitting protrusion protruding upward in the vertical wall insertion groove and mating with a hook portion of the vertical wall, wherein the hook portion is formed in an upper end of the vertical wall and is bent downward;
        a horizontal plate extending horizontally in the widthwise direction above the first vertical plate; and
        a second pressing screw inserted through a center of the horizontal plate to press an upper surface of the installation frame; and
    a center bracket having a first side allowing the installation frame to pass therethrough and a second side configured to surround the sprinkler, the center bracket comprising:
        a base frame having insertion holes facing each other and a supporting groove disposed between the insertion holes, the installation frame inserted through the insertion holes, and the supporting groove configured to support a first side of a circumference of the sprinkler;
        a rotating frame having a first end, a second end, and a pressing groove formed between the first end and the second end of the rotating frame, the first end of the rotating frame rotatably coupled to a first side of the base frame, the pressing groove configured to press a second side of the circumference of the sprinkler and to face the supporting groove, and the second end of the rotating frame detachably coupled to a second side of the base frame, wherein a coupling hole having female screw threads is formed in the second side of the base frame, and a screw hole is formed in the second end of the rotating frame in a position corresponding to the coupling hole;
        a fastening screw having male screw threads and inserted into the screw hole, wherein a head of the fastening screw is supported on a circumference of the screw hole; and
        a snap ring screwed to a body of the fastening screw with the rotating frame interposed between the snap ring and the head of the fastening screw.

2. The fixing apparatus of claim 1, wherein a recessed portion is formed around the coupling hole in a surface of the second side of the base frame.

* * * * *